Dec. 24, 1963   E. KRAMAR ET AL   3,115,633
OMNIDIRECTIONAL RADIO BEARING SYSTEM
Filed Feb. 24, 1960   2 Sheets-Sheet 2

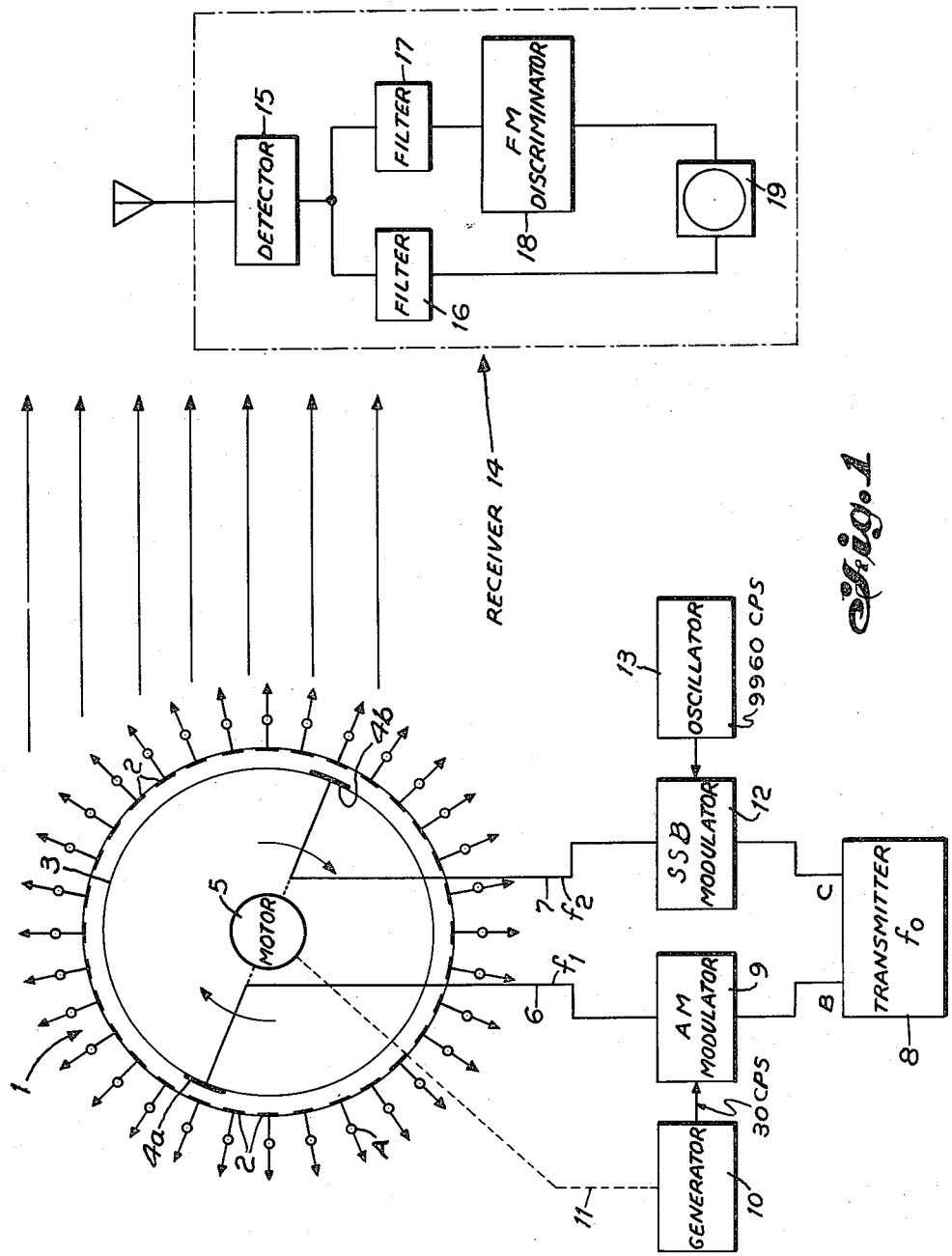

INVENTORS.
ERNST KRAMAR
BY FRITZ STEINER
ATTORNEY

3,115,633
OMNIDIRECTIONAL RADIO BEARING SYSTEM
Ernst Kramar and Fritz Steiner, Pforzheim, Germany, assignors, by mesne assignments, to International Standard Electric Corporation, New York, N.Y., a corporation of Delaware
Filed Feb. 24, 1960, Ser. No. 10,695
Claims priority, application Germany Feb. 28, 1959
6 Claims. (Cl. 343—106)

The present invention relates to a Doppler type omnidirectional radio bearing system, in which the Doppler effect is either caused by reception of the incoming non-directional modulated electromagnetic waves which are radiated from a transmitter, or by frequency modulated radiated waves containing directional information. The evaluation is obtained by means of a phase comparison of the envelope wave as derived from the frequency modulation, with a reference signal. The reference signal, in the case of a direction-finder, is produced locally whereas in the case of a radio beacon, is transmitted by a radio beacon, as a modulated carrier wave.

In particular the present invention relates to a Doppler type omnidirectional radio bearing system, employing the Doppler principle as well as employing a wide-aperture antenna system with a plurality of antennas disposed along the periphery of a circle. In the case of a beacon system these antennas are supplied with energy by means of a switching device in a cyclical order of succession and, in the case of a direction-finding system, are connected in the same way to the input of a special type of receiver.

As is well known, wide-aperture systems with a diameter of 2–3 wavelengths of the antenna system deliver unambiguous bearing results since they are not subject to site errors such as is found in the wide-aperture Adcock-systems.

By means of the cyclical connection of a circular antenna system which is preferably carried out with a quasi continuous transition from antenna to antenna, there is simulated the movement of a single antenna at a uniform velocity along a circular path. The frequency of scanning simulating the movement of a single antenna along the circular path, can also be termed "gyration frequency." Accordingly, in the case of a radio beacon system, the radio energy will appear at a remote receiving point in accordance with the "gyration frequency" in an approximately sinusoidal frequency-modulated manner. In the case of a direction finder, the incoming wave, which is non-modulated with respect to the direction, is only frequency-modulated by the apparent rotation of a single antenna on a circular path.

In many cases the principles of direction-finding can be applied in the same manner to radio beacon systems as well as to direction-finding systems, whereby in the case of a radio beacon, besides the directional or bearing modulation, there also has to be transmitted a reference signal which is of the same frequency as the directional modulation but, at a remote receiving point has the same phase angle which is independent of the azimuth with respect to the radio beacon.

In particular, there are a number of well-known direction-finding systems using wide-aperture antenna systems in which the frequency modulation of the received radio signal energy, which is produced by moving a single antenna on a circular path, or by effecting a scanning of a circular antenna system which is equivalent to this movement, is used for direction determination purposes.

The fact relating to the applicability of the principles of the bearing systems or direction-finding systems to radio beacons as well as to direction-finders has not only been determined in connection with earlier proposals, but has already been described in an earlier U.S. Patent No. 2,762,043, granted September 4, 1956, relating to an omnidirectional radio bearing system in which a circular antenna system is supplied with transmitting energy, and in which a phase-locked reference frequency is transmitted on a second carrier frequency (subcarrier) via a further individual antenna for effecting the phase comparison at the receiving end with the bearing wave (phase-modulated radio beacon). In applying the above principles to a direction-finding system, a direction-dependent phase modulation of the received wave is produced by scanning the circular antenna system, and the low-frequency voltage derived from the phase modulation, when compared with respect to phase with the scanning frequency (apparent gyration frequency), delivers the directional information. In this system, it is the phase steps that come out of the switching from antenna to antenna that are made use of for the determination of direction and not the frequency modulation with respect to the whole circular antenna system. Thus, strictly speaking, in the system described, we are not dealing with Doppler beacons or direction finders as we do in the present invention. This, however, is of no consequence as regards the application of such principles to radio beacons.

With all circular antenna systems of wide-aperture and having a cyclical scanning of the antennas the magnitude of the frequency deviation achieved by the Doppler effect depends on two factors, i.e., one on the magnitude or size of the base, that is, on the diameter of the antenna circle, and two on the scanning frequency; or, on the simulated or apparent gyration frequency. The maximum value of the Doppler frequency and, consequently, the frequency deviation is dependent on the velocity of the apparent antenna movement as achieved on the periphery of the circle either in direction to or from the remote receiving point, which is proportional to the diameter of the antenna system and to the angular velocity of the gyration frequency.

On account of this the technical expenditure in relation to the antenna system itself and to its connection with the transmitter or receiver is determined in several ways directly and indirectly.

First of all the frequency of the scanning (gyration frequency) is considered as fixed. In this case a frequency deviation or a desired magnitude can only be achieved by suitably dimensioning the diameter of the circle which, as is well-known, is independent of the scanning frequency, and which is not supposed to be lying below 2½–3 wavelengths which may amount to several meters in case of the frequency in question. It is obvious that merely an enlargement of the diameter for purely constructional reasons will entail a considerable technical expenditure. However, in connection with the enlargement of the diameter there is required an increase in the number of single antennas, because the spaced relation from antenna to antenna on the circle, for avoiding an unwanted amplitude modulation should not substantially exceed one quarter of the operating wavelength. If, on the other hand, the diameter and, consequently, the number of antennas is regarded as fixed, then the only variable lies in the gyration or actual scanning frequency. A high scanning frequency, in turn, again causes the bandwidth of the FM-receiver to be high which is necessary for the purpose of avoiding errors due to the effects of group delay (or transient response characteristic of the receiver). This, however, results in a considerable increase in expenditure with respect to the FM-receiver.

To eliminate the difficulty relating to receiver bandwidth a technique in accordance with the prior art as exemplified in U.S. Patent No. 3,048,843 may be used.

By means of this technique and by a combination of two periodic connecting signals there is simulated a movement of a single antenna in a way, that the movement is composed of a slow rotation and of a quick to-and-fro or pilgrim step motion.

Accordingly, this arrangement is still lying within the scope of the prior art in which, fundamentally, at one certain specific time position, only one antenna of the circular antenna system is connected, whereas the present invention provides another solution. However, in special cases, it may be appropriate to combine the principle of the just mentioned earlier proposal with that of the invention which will be described hereinafter.

The present invention relates to an omnidirectional radio bearing system utilizing the Doppler principle, comprising a wide-aperture antenna system consisting of a circular array of single antennas, and providing a periodic connection of single antennas in a cyclic succession.

Under the same conditions it is also possible to achieve a doubling of the frequency deviation with respect to the prior art whenever, according to the present invention, two antennas, disposed exactly or almost exactly opposite each other on the diameter of a circle, are activated simultaneously.

Based on the recognition that the bearing errors which are due to the propagation conditions of electric waves (multi-path propagation) can be avoided by employing wide-aperture antenna systems, all efforts have been made for transferring the principles of the wide-aperture antenna systems as known from the direction-finding technique, to radio beacon systems. In particular, attempts have been made for converting the VOR-beacons, which have already become well-known in air-traffic control systems, and which were hitherto equipped from a small-aperture antenna system into a wide-aperture antenna system. If possible, such a VOR-beacon system shall be designed in such a way as to be suitable, without affording any readjustment or alteration of the airborne receivers, a higher degree of accuracy or reliability with respect to bearing determinations.

Accordingly, at the output of the receiver there must be available the same criteria serving the direction-determination purpose, as are provided by the conventional types of VOR-beacon systems.

Subsequent to the demodulation of the radio energy as unidirectionally transmitted from the beacon (rotating cardioid pattern at 30 c.p.s.), at the output of a receiver suitable for receiving the signals of a VOR-beacon system, there is available a low-frequency voltage of 30 c.p.s., the phase angle of which is dependent upon the direction of incidence. Furthermore there is available a low-frequency voltage with a frequency of 9960 c.p.s. which, by adhering to a frequency deviation of 480 c.p.s., is frequency-modulated with a 30 c.p.s. component. The 30 c.p.s.-voltage as derived from this frequency modulation is phase-locked with respect to the voltage of 30 c.p.s. indicating the direction, and which represents the reference signal.

By maintaining this data as laid down by ICAO-standards with respect to VOR-beacons, and based on the principles applicable to wide-aperture antenna systems, there has already been proposed a wide-aperture radio beacon system operating in such as way that one antenna located in the center of the circular array of a plurality of single antennas transmits about 90% of the output of a transmitter amplitude-modulated with 30 c.p.s. with a modulation index of about 30%, while the remaining 10% of the output is transmitted by the antennas of the circular array in a cyclical succession via a switch rotating at a frequency of 30 c.p.s. The amplitude ratio of the radiation or transmission from the carrier antenna to the individual or single antennas of the circular array will then amount to about 3:1. During the reception of the entire radiation, there is likewise realized a modulation index of 30%. The frequency of the energy (about 10%) as fed to the circular antenna system, however, is still (e.g. by way of a single-sideband modulation) displaced by 9960 c.p.s. with respect to the frequency of the energy as fed to the carrier antenna, so that there will be transmitted two carrier frequencies spaced apart or separated by 9960 c.p.s., having a different amplitude of about 3:1.

At a remote receiving point of a radio beacon operating in the way as just described, there will then appear at the output of a conventional VOR-receiver, by the beat of the two carrier frequencies as transmitted by the beacon and with respect to a slight modulation index of 30%, with a good approximation, a sinusoidal voltage of a frequency of 9960 c.p.s., which due to the apparent gyration (or rotation) of an antenna on the circle (scanning of the antenna system) is frequency-modulated with 30 c.p.s. It will be seen that in the case of a radio beacon designed in such a way, unlike the conventional VOR-beacon systems, the bearing wave is derived from a frequency modulation, and the reference wave is derived from an amplitude modulation. However, since the phase-difference is used as the value for the azimuth, no difference will be registered at the output of the receiver.

In order to achieve the frequency deviation of 480 c.p.s., as laid down by ICAO-standards with respect to the conventional types of VOR-beacon systems it is necessary that in the case of a carrier frequency of about 115 mc., and in the case of the gyration or scanning frequency respectively of 30 c.p.s., which is likewise required according to the ICAO-standards, there will have to be used a circular-antenna diameter of about 5 operating wavelengths, as can be easily determined by calculation. However, since it is further necessary, as is well known, to choose the spaced relation of the antennas on the circle not greater than one quarter of the operating wavelength, there will result a great number of antennas amounting to approximately 50. Accordingly, the expenditure for such an antenna system is a considerable one, which is particularly dissatisfactory since in order to achieve a sufficient correcting (or improvement) factor with respect to a small-aperture antenna system, a diameter of a circular antenna systm of 5 wavelengths is not at all necessary. As is likewise already known, a diameter of the circular antenna system of about 2½–3 wavelengths is more than sufficient.

In this known type of embodiment of the antenna system for a modified VOR-beacon system comprising the just described type of transmitter system it is still regarded as a disadvantage that the carrier antenna is of the stationary type, so that at the receiving end the amplitude of the radio frequency voltage transmitting the reference signal, can easily become zero on account of multipath propagations. In this case a direction determination can no longer be carried out.

The present invention, therefore, proposes another solution. When applying the principle of the present invention to a radio beacon system, the just described disadvantages can be avoided in that a portion of the output of the transmitter (about 90%), which is amplitude-modulated with the reference signal of 30 c.p.s., is not transmitted via a stationary carrier antenna, but via one of two antennas disposed by 180° on about the same diameter of the circular antenna system, the remaining portion of the output (about 10%) is transmitted via the other antenna with a carrier wave displaced in frequency by a certain amount.

The feeding of the two antennas of the circular antenna system with the transmitter energy is appropriately effected by means of a capacitively-coupled switch of the disc or drum type as already known and described in Patent No. 3,048,843. This switch comprises two metal sheets on a motor driven rotor which are staggered with respect to each other by 180°.

The number of revolutions of the driving motor in the case of a rotor provided with only two metal sheets, of the capacitively-coupled switch type is equal to the desired apparent gyration frequency of the two antennas. However, there may also be used an already known capacitively-coupled switch, whose rotor is provided with a plurality of capacitive coatings, so that when correspondingly arranging the rotor plates in the conventional manner there is produced a multiplication of the gyration frequency with respect to the driving frequency. On account of this it is possible to use for the generation of a desired gyration frequency a correspondingly slow-running motor, which is an advantage in respect to the service lifetime of the switching device.

The function of the system will now be described first of all as applied to a radio beacon. Due to the simulated relative movement of the two antennas with respect to each other there is achieved in a receiver located at a remote receiving point of the beacon system, a doubling of the frequency deviation in the case of a certain specified diameter of the circular antenna system; or vice versa. For achieving a certain specified frequency deviation, for example, of 480 c.p.s., there is required, unlike known embodiments of radio beacons employing a circular antenna system and a carrier antenna (antenna located in the center of the circular array), only half the diameter of the circular antenna system, that is, there is only required half the amount of antennas. This results in a considerable reduction of costs for the antenna system.

A further advantage of the invention resides in the fact that the antenna, transmitting the reference signal as an amplitude modulation, continuously changes its location (or position), so that on account of space (or site) diversity a suppression of the carrier frequency due to multipath propagations will be prevented.

Of course, the system according to the invention is also applicable to a direction-finder application. In this way there results considerable advantages over the conventional or already proposed Doppler type direction-finding systems in that for determining the direction of an omnidirectionally operating transmitter there can be used an ordinary AM-receiver in which the group delay (transient response characteristic) is practically of no importance. On one hand the rotation of the antennas can be chosen low and, on the other hand, the evaluation of the frequency modulation is not effected in an FM-demodulator (discriminator) for the intermediate frequency, but in a low-frequency discriminator (FM-demodulator) (9960 c.p.s.), which, as is well-known, can be set very exactly and very sharply. On account of this it is also possible to avoid other errors, which are likely to occur when carrying out the evaluation in an intermediate-frequency discriminator.

Whenever, due to a detuning of the receiver, there appears a demodulation of the leading or trailing edges of the pulses in the intermediate frequency filters, or in the discriminator itself, it is likely that there is caused an indication with reversed sign of bearing indication resulting in a 180° bearing error.

The above-mentioned and other features and objects of this invention and the manner of attaining them will become more apparent and the invention itself will be best understood by reference to the following description of an embodiment of the invention taken in conjunction with the accompanying drawings, in which:

FIG. 1 is a schematic illustration of a Doppler type radio beacon system;

FIG. 2 illustrates the present invention utilized as a Doppler type direction-finder; and FIG. 3 illustrates a Doppler type direction-finding system, with the aid of which simultaneously the direction of incidence of two different transmitters can be determined.

The system as shown in FIG. 1 of the drawings consists of Doppler type radio beacon system equipment comprising a capacitively-coupled switching device as described in Patent No. 3,048,843, the stator 1 of which is provided with 32 capacitive coatings or plates 2 as antennas and are positioned in a circular array. The individual antennas are connected at the points designated by A, with the aid of cables to the individual plates 2. A rotor 3 comprising two metal plates 4a and 4b is driven by way of a motor 5, and the metal plates 4a and 4b are supplied, via lines or leads 6, 7, with the transmitter energy from transmitter 8, providing altogether approximately 200 watts at a frequency $f_0$. The transmitter 8 is provided with two output terminals B and C. To the output terminal B there are applied approximately 90% (about 180 watts), and to the terminal C about 10% (about 20 watts) of the output. The transmitting energy at the terminal B is amplitude-modulated in a modulator 9 with a frequency e.g. of 30 c.p.s., produced in a generator 10 by maintaining a modulation index of e.g. 30%, and is then fed via the line 6 (frequency $f_1$) to the one metal plate 4a of the rotor 3. Since the modulation frequency is related to the number of revolutions of the motor 5, in the most simple case it is equal thereto. It is, therefore, appropriate to couple the modulation frequency with the number of revolutions of the motor 5, which is denoted by the dashlined connection 11.

The transmitting energy at the terminal C of the transmitter 8, e.g. by way of a single-sideband modulation in a modulator 12, and with the aid of an oscillator 13, producing e.g. the frequency of 9960 c.p.s., is converted in the conventional manner into a new frequency $f_2$, differing from the transmitter frequency $f_0$ by a predetermined amount, e.g. 9960 c.p.s. If the antenna scanning device is now put into rotation by means of motor 5, with the transmitted waves being received by a receiving equipment 14, then at the output of receiver 14, which corresponds to the construction of a receiver used for VOR-beacon systems, and subsequently to the amplitude-demodulation, there will appear in the detector 15 of the apparatus two voltages of the frequencies 30 and 9960 c.p.s., of which the latter has been produced by a beat of the two frequencies $f_1$ and $f_2$. Due to the rotation of the switching device of the transmitter system the frequency of 9960 c.p.s. is frequency-modulated with the frequency of 30 c.p.s. These two frequencies (30 c.p.s. and 9960 c.p.s.) are separated by way of filters 16 or 17 respectively. The voltage of the frequency 9960 c.p.s. which is frequency-modulated with 30 c.p.s., is demodulated by means of a low-frequency discriminator 18, on account of which there is produced a voltage of 30 c.p.s., the phase angle of which, compared with the reference signal of 30 c.p.s. which is directly derived from the amplitude-demodulation, indicates the direction of the received waves. The two 30 c.p.s.-signals from the filters 16 and the discriminator 18 are compared in the conventional manner with respect to phases by means of a combined phase measuring and indicating device 19, and the phase-difference is indicated thereon.

In the case of an application of the principle of the present invention as shown schematically in FIG. 2, to a direction-finding station, the scanning device exactly corresponds to that shown in FIG. 1. From a remote transmitter the waves are received by a ground station with connected antennas as described above. The signals arriving via the line 6 from one antenna are directly fed to the input of an AM-receiver 20, while the R.F.-signal from the other antenna on the line 7, before reaching the input of the receiver 20, is converted into another frequency, that is, displaced by a certain amount, e.g. by 10 kc., with respect to the received carrier frequency. This is accomplished in a conventional manner in that the signal of the received frequency directly, and via a 90°-phase-shifter 22 is respectively fed to push-pull modulators 23 and 24, to which there are also fed two orthogonally related reference voltages (sin ($u$) and cos ($u$)) of a low-frequency auxiliary carrier frequency generator 25, e.g. having a frequency of 10 kc. As is well-known, the connected outputs of the push-pull modulators 23 and 24 contain as a modulation product only the one sideband of the carrier wave, which is staggered with respect thereto by the modulation frequency. This frequency is likewise fed to the input of the receiver 29, in which the voltages are amplified and demodulated. Subsequent to the demodulation, and by a beat of the two carrier frequencies, there is produced a voltage with a frequency which is equal to that of the auxiliary carrier, e.g. of 10 kc. However, due to the rotation (or gyration) of the switch this voltage of 10 kc. is still frequency-modulated with the gyration frequency (30 c.p.s.). This voltage is limited in the conventional manner by means of an amplitude-limiter (26) and is demodulated (27). The output voltage of the low-frequency discriminator 27 (FM-demodulator) is a frequency, e.g. of 30 c.p.s., corresponding to the gyration frequency of the switch which is energized by the generator 29, and the phase angle of which indicates the direction of incidence of the waves. Together with two orthogonally related reference voltages, which are derived in the conventional manner from the gyration frequency, it is fed to a combined phase measuring and indicating device 28, adapted to indicate the direction of incidence of the waves e.g. by way of a light spot within a polar co-ordinate system as known in the prior art.

In FIG. 3 there is described an antenna system for obtaining the simultaneous direction-finding of two transmitting stations.

The radio-frequency voltages as received by the connected antennas, of the frequency $F_1$ and $F_2$, both of which exist on the line 6 as well as on the line 7 (FIG. 1) are fed to two different inputs of a parametric modulator 30 of the type known per se, and which is controlled by an auxiliary carrier wave generator 31 producing a frequency $F_3$ (e.g. of 10 kc.). To the line 7 there is also connected the input of a receiver 32, which is tuned to the carrier frequency $F_2$. On account of the single-sideband-modulation in the modulator 30 also the frequency $F_2+F_3$ will appear at the input of this receiver. In accordance with the scheme as shown in FIG. 2, these two frequencies are further evaluated. The output of the receiver, after demodulation, contains a frequency $F_3$ (10 kc.), which is frequency-modulated with the gyration frequency of the antenna switching device, e.g. of 30 c.p.s. The amplitude of this voltage is limited or demodulated respectively in a limiter-discriminator 33, and is fed to a combined phase measuring and indicating device 34, to which there are also fed in the conventional manner two orthogonally related reference voltages from a reference voltage generator 35, which is coupled to the rotor of the switch by way of the connection 11. A second receiver 36, which is constructed or designed in the same way as the first one, is connected to the line 6. This channel 36 is tuned to the frequency $F_1$. Due to the modulation with the frequency $F_3$ (10 kc.) there is also applied to the input of the receiver the frequency $F_1+F_3$. At the outlet of the receiver 36 and after demodulation, there is produced a voltage of the frequency (10 kc.) which, due to the rotation (gyration) of the antenna switch, is frequency-modulated with the gyration frequency. In a limiter-discriminator 37 this voltage is then limited or demodulated respectively. On account of this, just like with the first receiving channel, there is produced a voltage of the gyration frequency, e.g. of 30 c.p.s., in which the directional information is contained as a phase angle. This voltage is then fed to a combined phase-measuring and indicating device 38, and the phase angle indicating the direction of incidence of the waves is then indicated just like in the case of the first receiver channel.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An omnidirectional radio bearing system comprising an antenna system consisting of a circular array of single separate antennas, switching means to periodically connect to each of said single antennas in a cyclical succession to provide a transmission path with said antennas for signals coupled thereto and means to simultaneously couple different signals to each of two antennas oppositely disposed on the diameter of the circle.

2. An omnidirectional radio bearing system according to claim 1 further comprising means to couple to one of said oppositely disposed antennas a signal of a first frequency and means to couple to said other antenna a signal of a second frequency.

3. An omnidirectional radio bearing system according to claim 2 wherein said second frequency differs from said first frequency by a predetermined amount and said first signal is amplitude modulated at the frequency of said cyclical succession.

4. An omnidirectional radio bearing system for use with a conventional VOR receiver comprising an antenna system, said antenna system comprising a circular array of single antennas, switching means to periodically connect to each of said single antennas in a cyclical succession to provide a transmission path with said antennas for signals coupled thereto, means to simultaneously couple said signals to each of two antennas oppositely disposed on the diameter of the circular array, means to couple to one of said oppositely disposed antennas a signal of a first frequency, means to couple to the other antenna a signal of a second frequency differing from said first frequency by 9960 c.p.s., the number of said antennas and the diameter of the circular array in accordance with the operating wavelength being so chosen that at the receiver there will result a frequency deviation of 480 c.p.s., and means to amplitude modulate said first frequency signal with the cyclical succession of 30 c.p.s.

5. An omnidirectional radio bearing system for determining the direction of a source of signals comprising an antenna system, said antenna system comprising a circular array of single antennas, motive means to periodically connect to each of said single antennas in a cyclical succession to provide a transmission path with said antennas for signals coupled thereto, means to simultaneously couple said signals to each of two antennas oppositely disposed on the diameter of said circular array, modulating means including an auxiliary carrier, means coupling the output of the other antenna to said modulating means, means to combine the output of said modulating means with the output of said first antenna, a receiver, means coupling said combined signals to said receiver whereby there is produced as the output thereof the auxiliary carrier signal modulated with the gyration frequency of said cyclical succession, means to demodulate said auxiliary carrier signal to produce a signal of the gyration frequency having a phase angle corresponding to the direction of said signal source, phase comparison means, means coupling the energizing signal of said motive means and the signal derived from said demodulating means to said comparison means whereby there is produced as the output thereof the direction of incidence of said signals from said source.

6. An omnidirectional radio bearing system for determining the direction of first and second sources of signals comprising an antenna system, said antenna system comprising a circular array of single antennas, motive means to periodically connect to each of said single antennas in a cyclical succession to provide a transmission path with each said antenna for signals coupled thereto, means to simultaneously couple said signals to each of two antennas oppositely disposed on the diameter of said circular array, modulating means including an auxiliary carrier, a first receiver tuned to the frequency of said first signal source, a second receiver tuned to the frequency of said second signal source, means coupling the output of one said antenna to said modulating means and said first receiver, means coupling the output of the other antenna to said modulating means and said second receiver whereby there is produced as the output of said first receiver said auxiliary carrier frequency modulated by the gyration frequency of said motive means and having a phase angle corresponding to the direction of said first signal source, and as the output from said second receiver, said auxiliary carrier frequency modulated by the gyration frequency of said motive means and having a phase angle corresponding to the direction of said second signal source, means to demodulate said first receiver output, means to demodulate said second receiver output, first phase comparing and indicating means responsive to said first receiver demodulated output and the energizing signal of said motive means to produce an indication of the direction of incidence of said signals from said first source, and second phase comparing and indicating means responsive to said second receiver demodulated output and said energizing signal to produce an indication of the direction of incidence of said signals from said second source.

References Cited in the file of this patent
UNITED STATES PATENTS

| | | |
|---|---|---|
| 2,188,649 | Carter | Jan. 30, 1940 |
| 2,962,715 | Byatt | Nov. 29, 1960 |
| 2,985,876 | Clough et al. | May 23, 1961 |

OTHER REFERENCES

Electronic Industries and Tele-Tech, January 1957, pp. 75–77, 147; February 1957, pp. 66, 67, 124, 128.